(12) United States Patent
Womack et al.

(10) Patent No.: US 7,161,915 B2
(45) Date of Patent: Jan. 9, 2007

(54) WIRELESS QUALITY-OF-SERVICE DETECTION METHOD

(75) Inventors: James E. Womack, Bedford, TX (US); Niranjan N. Segal, Arlington, TX (US); Kenneth T. Smelcer, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/831,996

(22) Filed: Apr. 26, 2004

(65) Prior Publication Data
US 2005/0237968 A1    Oct. 27, 2005

(51) Int. Cl.
*H04Q 7/20*  (2006.01)
(52) U.S. Cl. ........................ 370/332; 370/338
(58) Field of Classification Search ............... 370/242, 370/243, 244, 245, 246, 248, 338, 389, 392
See application file for complete search history.

(56) References Cited

U.S. PATENT DOCUMENTS

| | | | |
|---|---|---|---|
| 2002/0069278 A1 | 6/2002 | Forslöw | |
| 2003/0123420 A1* | 7/2003 | Sherlock | 370/338 |
| 2004/0008652 A1* | 1/2004 | Tanzella et al. | 370/338 |
| 2004/0073641 A1* | 4/2004 | Minhazuddin et al. | 709/223 |
| 2005/0003827 A1* | 1/2005 | Whelan | 455/454 |
| 2005/0055568 A1* | 3/2005 | Agrawala et al. | 713/200 |
| 2005/0138200 A1* | 6/2005 | Liu et al. | 709/238 |

OTHER PUBLICATIONS

Schulzrinne H. et al., "RTP: A Transport Protocol for Real-Time Applications", Network Working Group, Request for Comments: 3550, Jul. 2003, 93 pages.
Schulzrinne H. et al., "RTP: A Transport Protocol for Real-Time Applications", Network Working Group, Request for Comments: 1889, Jan. 1996, 67 pages.

* cited by examiner

*Primary Examiner*—Chi Pham
*Assistant Examiner*—Anh-Vu Ly

(57) ABSTRACT

A wireless mobile station experiencing quality-of-service events (including, in some embodiments, quality-of-experience events) automatically transmits corresponding information, along with information that identifies a corresponding access point, to a quality-of-service network element. The latter can use this information to rapidly detect a quality-of-service problem and to also respond, automatically, with a problem isolation strategy and, if desired, automated curative actions such as automated re-routing.

7 Claims, 2 Drawing Sheets

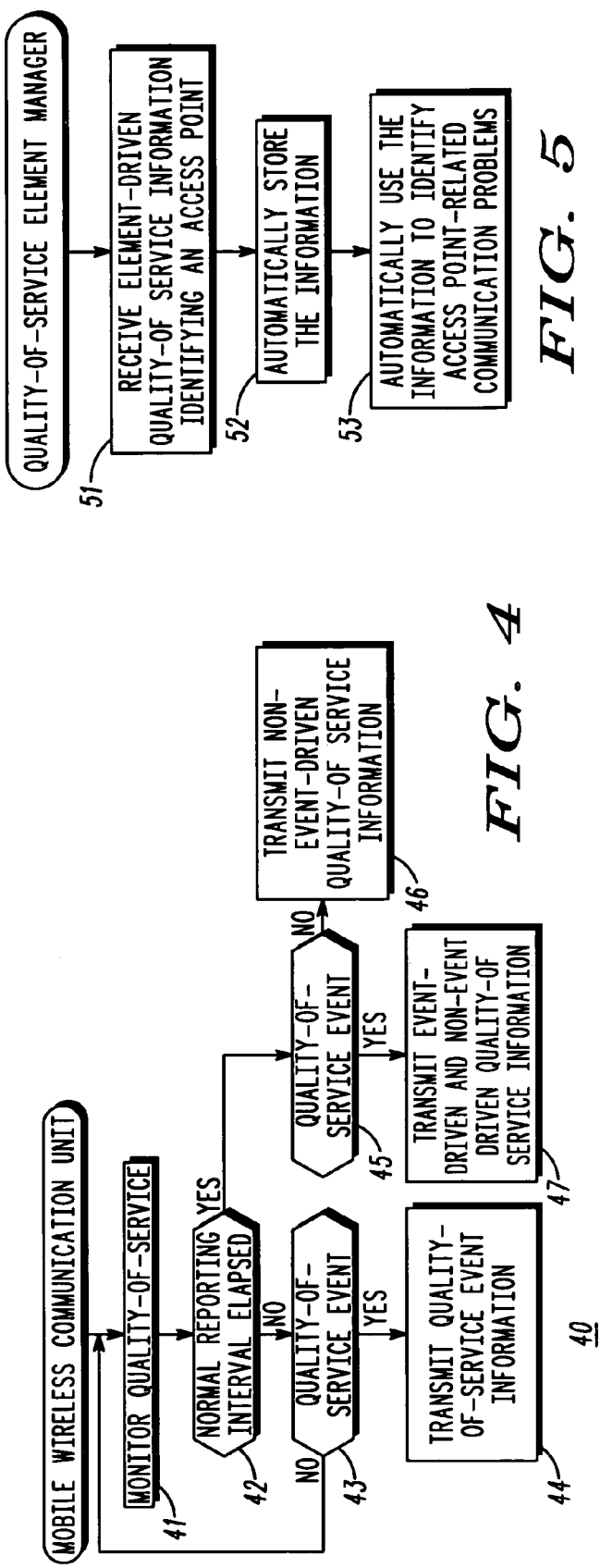

US 7,161,915 B2

WIRELESS QUALITY-OF-SERVICE DETECTION METHOD

FIELD OF THE INVENTION

This invention relates generally to mobile wireless communications and more particularly to quality-of-service.

BACKGROUND OF THE INVENTION

Wireless communication systems of various kinds are known in the art. Most such systems must provide at least some nominal level of quality-of-service with respect to supported wireless communications in order to provide effective communications. There are numerous circumstances and events, however, that will impair quality-of-service and hence potentially degrade a system's ability to deliver required services.

Some systems are of simple enough design and operation to permit relatively modest actions to preserve or protect a given quality-of-service level. In many cases, however, significant problems in this regard can occur. In many cases quality-of-service can be similarly impaired by a wide variety of potential causes. This can make identification of a specific actual cause more difficult. It then follows, of course, that it can be more problematic to resolve a given quality-of-service issue when the cause itself eludes identification.

Wireless communication systems comprising, in whole or in part, a wireless local area network (WLAN) (such as a network that is based upon any of the 802.11 family of wireless local area network standards) are an example of such a problem. A WLAN as operated by a given enterprise (such as a multi-floor building or multi-campus business or other organization) that supports so-called Voice-over-Internet-Protocol (VoIP) in particular requires both a relatively high quality-of-service and presents significant challenges to quickly and accurately locating a specific problem when one arises. For example, an element manager for such a system may (or may not) have data that suggests unacceptable user experiences, but will lack the data to permit a useful system diagnosis to address the underlying cause and/or source of that problem.

BRIEF DESCRIPTION OF THE DRAWINGS

The above needs are at least partially met through provision of the wireless quality-of-service detection method described in the following detailed description, particularly when studied in conjunction with the drawings, wherein:

FIG. 3 comprises a schematic view of a message packet;

FIG. 4 comprises a flow diagram as configured in accordance with various embodiments of the invention; and FIG. 5 comprises a flow diagram as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Generally speaking, pursuant to these various embodiments, a mobile wireless communication unit detects quality-of-service events if and as they occur during a wireless communication. When one occurs, the mobile wireless communication unit also determines an identifier for an access point as is associated with that quality-of-service event. That mobile wireless communication unit then automatically transmits a message that comprises information regarding the quality-of-service event and the identifier for the access point.

So configured, the wireless communication system (via, for example, an element manager) can receive that information and automatically store the event-driven quality-of-service information. That information can then be used to automatically identify access point-related communication problems. In a preferred approach such usage can include identifying paths between various corresponding access points and querying network elements along selected paths to develop information useful to isolate the problem. Such information can be used to effect automatic re-routing to thereby avoid an identified network element problem.

These and other benefits will become more evident to those skilled in the art upon making a thorough review and study of the following detailed description.

Figure 1:
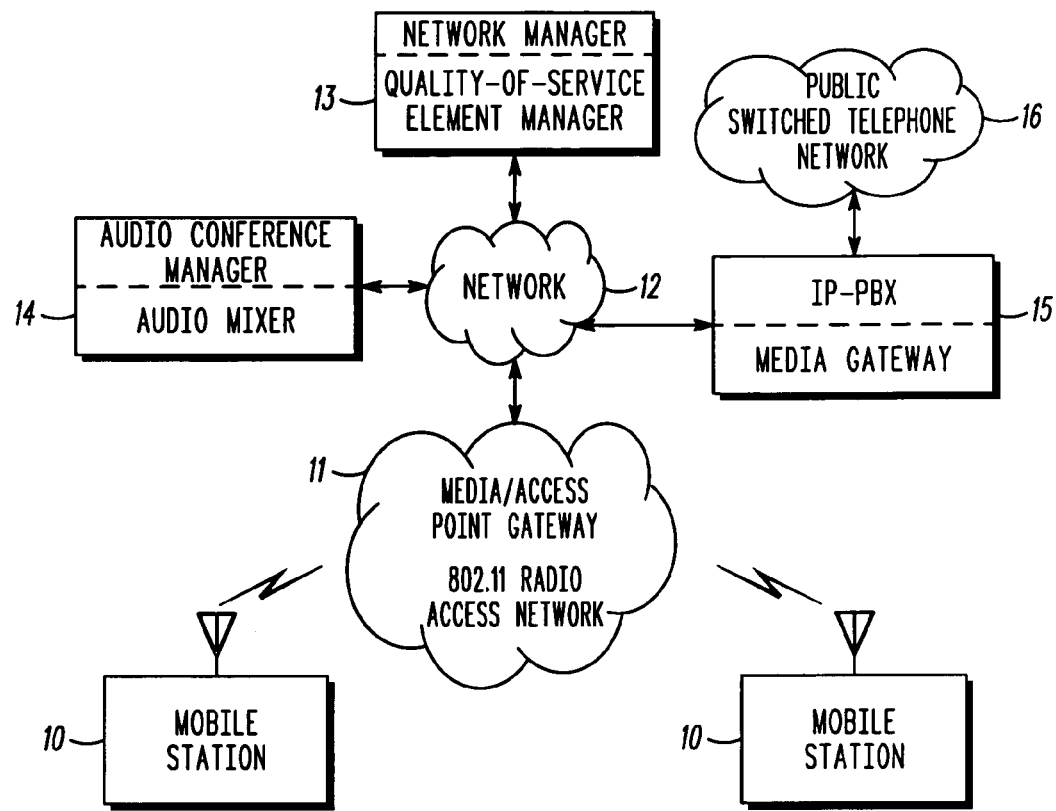
FIG. 1 comprises a block diagram as configured in accordance with various embodiments of the invention.

Referring now to FIG. 1, an exemplary wireless communication system suitable to embody and benefit from these teachings will be described. Those skilled in the art will know and appreciate that this described system serves an illustrative role only and that these teachings may be employed in a wide variety of communication systems.

This illustrative system comprises an enterprise platform that supports voice communications by and between various mobile stations 10. These mobile stations 10 communicate via an 802.11 radio access network (RAN) 11 (such as an 802.11a, 802.11b, or 802.11g compliant network) that serves as a media/access point gateway. Such networks are well understood in the art and are known to typically include one or more access points that serve as the wireless transceiver point-of-connection for end points such as the mobile stations 10. In this embodiment, the RAN 11 couples via a network 12 (such as, for example, an enterprise local area network) to a network manager 13 serving, at least in part, as a quality-of-service element manager in a manner consistent with known prior art practice (in a preferred embodiment, the network manager 13 will typically further support a display-capable user interface to facilitate user interaction with respect to control and configuration of the system).

So configured, the mobile stations 10 are able to conduct wireless voice communications amongst themselves using, for example, VoIP in combination with the wireless coverage and access facilitated by the RAN 11 in accordance with known or proposed practice. In addition, if desired, an audio conference manager/audio mixer 14 can operably couple to the network 12 to support, for example, multi-party conferencing. Also, and again if desired, an Internet-based private branch exchange (IP-PBX) 15 can be operably coupled to the network 12 to serve as a media gateway and provide communications access to the public switched telephone network 16. So configured, the mobile stations 10 can conduct voice communications via the RAN 11 and IP-PBX 15 with non-enterprise parties as well.

In many deployments the RAN 11 will include a plurality of wireless access points (not shown) (this owes, in part, to the typically limited coverage area associated with any one access point—a plurality of access points are usually required to obtain useful coverage in any setting other than a smaller residential paradigm). Using real-time control protocol (RTCP) in accord with prior art teachings, a mobile station 10 can transmit information as collected over time regarding certain quality-of-service experiences (such RTCP messages are sometimes directed, in such an embodiment, to the quality-of-service element manager). Unfortunately, as noted above, the content of such messages is insufficient in some cases to clearly indicate that a specific quality-of-service problem exists, and even when such can be gleaned from present report content, the quality-of-service element manager, even with otherwise sufficient knowledge of the network topology, will typically be unable to ascertain the source of such a problem.

For example, when two mobile stations 10 are communicating with one another, the communication path will typically include at least two access points (one for each mobile station 10). If that communication should suddenly drop, the quality-of-service element manager may have insufficient knowledge of this event and/or if somehow aware, will likely be unable to determine which, if any, access point is potentially at fault.

Figure 2:
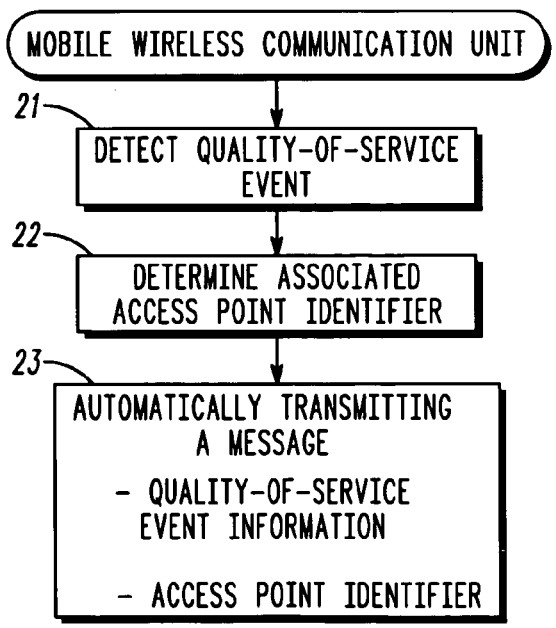
FIG. 2 comprises a flow diagram as configured in accordance with various embodiments of the invention.

Pursuant to these embodiments, and referring now to FIG. 2, a mobile wireless communication unit can effect unilateral actions that can, in turn, significantly leverage the ability of an element such as the quality-of-service element manager to both facilitate the detection of an unacceptable quality-of-service and to divine a likely source of the detected problem.

The mobile wireless communication unit monitors for at least one predetermined quality-of-service event during a wireless communication and upon detecting 21 such an event, determines 22 an identifier for the access point that is associated with that quality-of-service event. The predetermined quality-of-service event can be essentially any quality-of-service event of interest or concern, including but not limited to packet jitter, packet delays, and dropped packets. In a preferred approach the monitored quality-of-service event can further comprise a quality-of-experience event as may occur during the wireless communication. Such quality-of-experience events can be many and varied and can include but are not limited to:

- the duration of an access point-to-access point handoff;
- the duration of an access point-to-wide area network handoff;
- the duration of a wide area network-to-access point handoff;
- call duration information;
- the duration of a call process delay;
- wireless local area network coverage strength duration information;
- dispatch-style call set-up duration information;
- a failure regarding any of a wide area network handover, wireless local area network coverage, availability of public switched telephone network resources, excessive setup delay, excessive packet loss, bandwidth reservation, user authorization, and device authorization;
- a success regarding any of bandwidth reservation, user authorization, and device authorization;

to name a few examples.

The identity of the access point can be ascertained and/or represented in any desired fashion. For example, the mobile wireless communication unit can identify a given access point in any of a variety of ways. For example, the mobile wireless communication unit can identify the address by referring to the MAC header. As another example, the mobile wireless communication unit can identify a given access point by its assigned canonical name. For many purposes, the latter probably comprises the preferred choice.

There may occur operational circumstances when more than a single access point as corresponds to a given wireless communication will be known to a single mobile wireless communication unit. When this occurs, such a unit can determine the identifier for each such access point as per the above-described process 20.

The mobile wireless communication unit then automatically transmits 23 a message that comprises, at least in part, information regarding the quality-of-service event and the identifier for the access point (or access points). As will be described below in more detail, this message can comprise only event-driven information or can also contain, if desired, non-event-driven information as well. In a preferred approach, the above-described quality-of-service element manager comprises the intended recipient of this message.

Such a message can assume various forms and observe any of a wide variety of protocols, of course, as will be understood by those skilled in the art. By one approach the message comprises an application-defined real-time control protocol (APP) packet. Real-time control protocol (RTCP) formatting and content is well understood in the art. The corresponding RTCP standard readily accommodates altered packet design for special purposes. In a preferred approach this message will at least contain information regarding an identifier for the mobile wireless communication unit (particularly when no session identifier exists or is available), an identifier (or identifiers) for a corresponding access point, a session identifier (particularly when no identifier for the mobile wireless communication unit is available), a timestamp, an event identifier, and data, statistics, and/or codes that characterize the quality-of-service event of interest.

A suitable APP format layout will generally comprise a series of entries representing such data with each entry preferably having a corresponding type field, a length field, and a field for the information itself. FIG. 3 presents an illustration of one possible APP packet design 30 employing such an approach and that would both support the message content requirements of these teachings while also remaining compatible with RTCP.

As mentioned earlier, a mobile wireless communication unit employing prior art techniques will typically monitor one or more quality-of-service parameters or indicia and provide an occasional non-event-driven report to its home system (for example, such a report will be provided to a corresponding quality-of-service element manager). In many applications it will be desirable to continue this practice notwithstanding the employment of the event-driven reports contemplated herein. If desired, such event and non-event-driven messages can be effected in a discrete fashion from one another. In a preferred approach, however, consolidation of report content will be accommodated when possible.

There are various ways to achieve such consolidation. With reference to FIG. 4, and pursuant to one illustrative approach, a mobile wireless communication unit monitors 41 one or more quality-of-service indicia during its wireless communications. One or more of these indicia can correspond to the quality-of-service events as contemplated above and one or more can correspond to general quality-of-service data (it is of course possible that all monitored quality-of-service conditions serve both purposes). The mobile wireless communication unit then determines 42 from time to time (such as every five seconds) whether a nominal reporting interval has elapsed. This interval can equal any duration as best comports with the needs of a given application. For example, a duration of one second might be appropriate for some systems while ten seconds might be suitable in others, and with one minute or ten minutes being a useful duration value in yet others. When such an interval has not yet elapsed, the mobile wireless communication unit can then determine 43 whether a quality-of-service event has occurred and, when true, transmit 44 that quality-of-service event information (for example, as described above).

When the nominal reporting interval has elapsed, however, the mobile wireless communication unit can then determine 45 whether a quality-of-service event has also occurred (for example, within some very recent timeframe). When true, the mobile wireless communication unit can transmit 47 a message that comprises a combination of both the event-driven quality-of-service information and the non-event-driven quality-of-service information. As before, if desired, this message can again comprise an APP packet formed using RTCP. So configured, the event-driven information can essentially piggyback with the non-event-driven information. Such clustering may be useful in at least some applications. (Of course, when no event-driven information exists to transmit, the mobile wireless communication unit can simply transmit 46 the non-event driven quality-of-service information.)

So configured, a mobile wireless communication unit will monitor for various quality-of-service conditions and events and make scheduled and/or event-driven reports regarding such conditions (including, when the information reflects event-driven conditions, an identifier for involved access points). In a preferred approach, and referring now to FIG. 5, a quality-of-service element manager receives 51 these transmissions and automatically stores 52 the received information. Pursuant to one approach the quality-of-service element manager stores all (or essentially all) such received information. Pursuant to another approach the quality-of-service element manager (or an available supporting server) processes such information (alone or in conjunction with other previously received data) to form, for example, a statistical view of the data. The quality-of-service element manager could then store that statistical data as versus the raw data itself. Pursuant to yet another approach the quality-of-service element manager could identify and store only the more important items of data (such as, for example, data that appears to correspond to more pathological conditions or events). (It will be understood by those skilled in the art that such storage can be effected local to the quality-of-service element manager and/or remotely therefrom as may best fit the capabilities of a given system architecture.)

The quality-of-service element manager can then automatically use 53 such quality-of-service information, including especially the event-driven quality-of-service information, to identify access point-related communication problems. As one illustrative example of many, the quality-of-service element manager can process such stored information to identify a dropped call occurred within the system. The element manager can then use the stored information to identify, for example, two specific access points as correlate to this reported problem. The element manager can then automatically (or upon the instance of a human operator) identify all paths between these two particular access points, and then identify the shortest path, and then query each network element along that shortest path to obtain problem isolation information. When and if that series of queries does not isolate the source of the problem, and when paths other than the shortest path exist, the element manager can then query the unqueried network elements along a next shortest path to again seek to isolate the source of the problem. This process can continue until the network element isolates the problem or all possible paths are investigated without success.

When the network manager successfully isolates the source of a given problem, the network manger, itself or through an appropriate surrogate, can automatically source a report and/or alarm condition. In addition, or in the alternative, such a network manger can also automatically (or at the instance of a human operator) effect an attempted remedy. For example, upon identifying a particular access point as being the source of a given problem, the network manger can effect re-routing of present and/or future communications to thereby avoid that particular network element problem. Such re-routing can include directing mobile stations to use a specific virtual local area network identifier to route traffic around a problematic switch or router. A troublesome router may also be potentially handled (in at least some cases) by adjusting the DiffServ code-point (DSCP) to provide a higher priority to the packets. Or, as another approach upon initiating the connection, one may select an alternative access point to avoid the troublesome access point.

So configured, when a problem occurs between the endpoints of a given wireless communication, an element manager receives information regarding the endpoint identifiers (or, if not available, a call identifier), the problem, and the time when the problem occurred. The element manager can then use a mapping program to extract information regarding the access points as are associated with the corresponding mobile stations at that particular time. All paths between those two access points are identified with the shortest path being first identified (using, for example, a resource such as Traceroute) and each network element along that path being queried to isolate the problem. Failing such isolation, additional paths are similarly identified and queried. Curative steps can be effected upon correlating a given problem to a given access point. For example, the element manager can cause the mobile station (or stations) conducting a present call via a given access point to handover to another access point to avoid a problem associated with the given access point.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, when effecting re-routing to avoid an identified problem, the mobile station (or stations) could be provided with a plurality of re-routing options (such as multiple virtual local area network identifiers). This might permit mobile stations to take corrective action more quickly in the event of near-term quality-of-service events.

We claim:

1. A method for use by a mobile wireless communication unit comprising:
   monitoring quality-of-service performance with respect to wireless communications;
   determining whether a nominal reporting interval has elapsed;
   when the nominal reporting interval has elapsed:
   forming a non-event-driven message that comprises quality-of-service performance information;
   when an event-driven quality-of-experience event occurs:
   (a) forming an event-driven message including (i) quality-of-experience performance information regarding the quality-of-experience event, (ii) information regarding a corresponding access point and (iii) the non-event driven message and (b) transmitting the both the event-driven message and non-event driven message;
   when a quality-of-service event has not occurred, transmitting the non-event driven message.

2. The method of claim 1 wherein forming a non-event-driven message further comprises forming an APPlication-defined Real-Time Control Protocol (APP)packet.

3. The method of claim 2 wherein forming an APP packet further comprises forming an APP packet using Real-Time Control Protocol.

4. The method of claim 2 wherein forming an event-driven message further comprises forming an APP packet that includes information regarding the quality-of-experience event and the information regarding the corresponding access point.

5. The method of claim 4 wherein the information regarding the corresponding access point comprises an identifier.

6. The method of claim 5 wherein the identifier comprises at least one of a basic service set identifier and a canonical name.

7. The method of claim 1 wherein the quality-of-experience performance information further comprises at least one of:
   a duration of an access point-to-access point handoff;
   a duration of an access point-to-wide area network handoff;
   a duration of a wide area network-to-access point handoff;
   call duration information;
   a duration of a call process delay;
   wireless local area network coverage strength duration information;
   dispatch-style call set-up duration information;
   a failure regarding any of a wide area network handover, wireless local area network coverage, availability of public switched telephone network resources, excessive setup delay, excessive packet loss, bandwidth reservation, user authorization, and device authorization;
   a success regarding any of bandwidth reservation, user authorization, and device authorization.

* * * * *